Patented Apr. 25, 1950

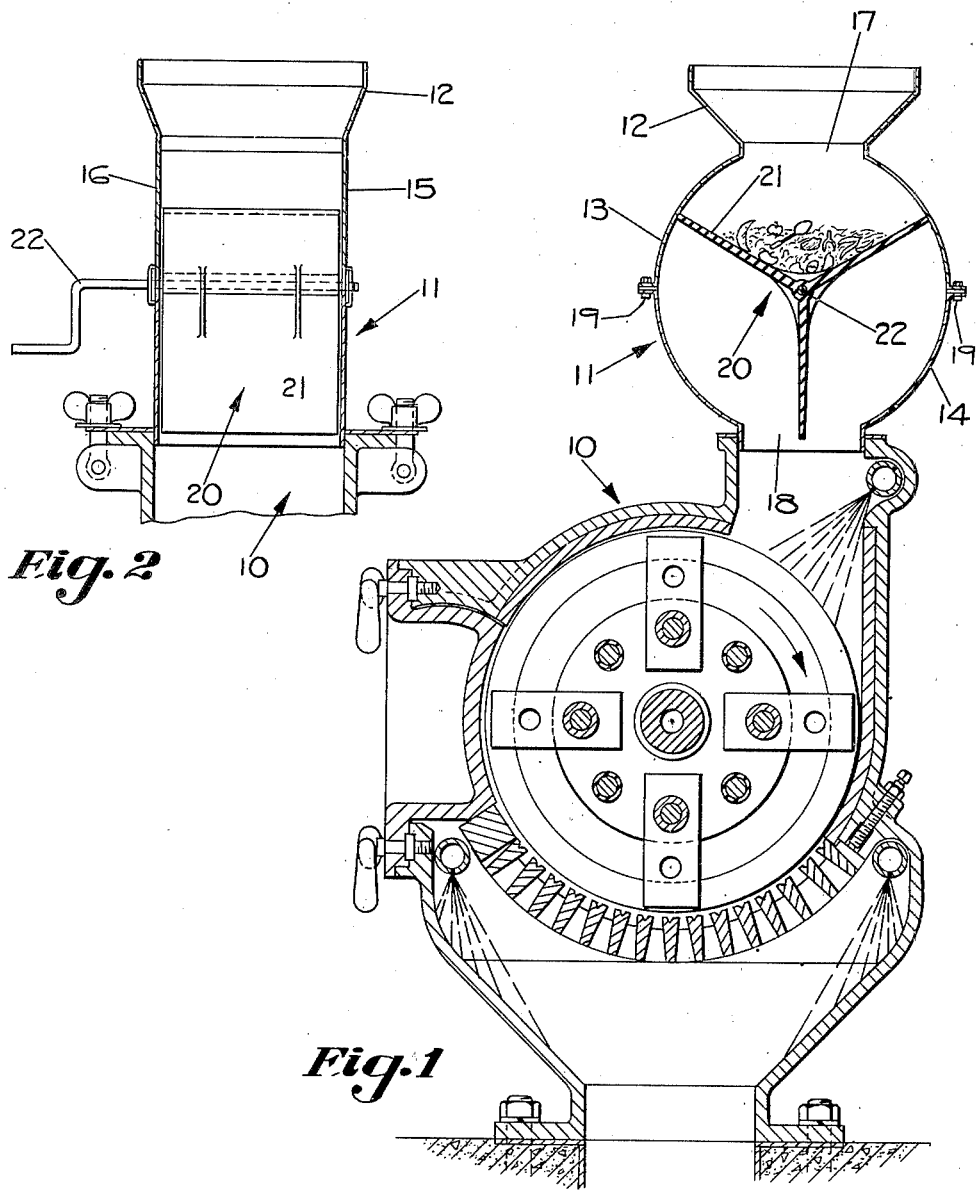

2,505,674

UNITED STATES PATENT OFFICE 2,505,674

GARBAGE GRINDER AND FEEDER

Lloyd K. Knight, Westerville, Ohio, assignor, by mesne assignments, to The Jeffrey Manufacturing Company, a corporation of Ohio Application November 20, 1945, Serial No. 629,773

1 Claim. (Cl. 241—186)

This invention relates to a garbage feeder, and an object of the invention is to provide an improved and simplified feeder for a garbage grinding machine or the like.

Another object of the invention is to provide an improved star feeder in combination with a garbage grinder in which a star rotor of rubber or equivalent flexible material is provided to prevent injury to the feeder in case an obstruction is encountered and also to act automatically to wipe the interior of the feeder free of garbage and the like during operation.

Other objects of the invention will appear hereinafter, the novel features and combinations being set forth in the appended claim.

In the accompanying drawings,

Fig. 1 is a sectional elevational view of a garbage grinder and feeder incorporating the features of my invention; and Fig. 2 is a transverse sectional elevational view showing the feeder and the mechanism for attaching it to a grinder.

A garbage grinder 10 or the like is shown which is provided with the feeder of my invention which is generally designated 11. Said feeder 11 includes a casing or housing 12, the central portion of which is in the shape of a drum or cylinder, the axis of which is horizontal, said drum or cylinder being, of course, formed by a pair of arcuate end walls 13 and 14 interconnected by upright side walls 15 and 16.

At the top of the cylindrical portion there is a feed opening 17 and at the bottom there is a discharge opening 18, the latter discharging material from the housing 12 into the feed throat of the garbage grinder 10. The casing 12 is preferably split along a horizontal axis passing through its center, the upper and lower halves being held together by bolts 19.

Within the cylindrical portion of the casing or housing 12 and mounted for rotation on the horizontal axis thereof is a star rotor 20 which is shown provided with three radial blades 21, this being the minimum number which will provide continuous isolation of the feed opening 17 from the discharge opening 18 so that for all positions of the rotor 20 it will be impossible for material to pass freely through the casing 12 from the feed opening 17 to the discharge opening 18. In other words, in all of its positions the rotor 20 interposes a barrier between said feed and discharge openings 17 and 18, respectively. This, of course, makes it possible to accumulate material in one of the pockets or compartments of the rotor 20, as illustrated in Fig. 1 of the drawings, and also acts in the nature of a seal against gaseous or solid material flowing upwardly through the feeder 11.

One of the features of the invention is the fact that the star rotor 20, including its blades 21, is made of flexible material, preferably flexible rubber. This has a number of advantages. For example, should a bone or any other obstacle be caught between a peripheral edge of a blade 21 and the casing 12 the blade can deflect and pass over the obstruction without damage to the rotor or the casing or should the star rotor be inadvertently rotated while the operator has his hand in the feeder his hand will most likely not be seriously injured. Furthermore, both the side edges and the periphery of each blade 21 has a wiping contact with the adjacent cylindrical portion of the casing 12 and as a consequence acts to wipe said cylindrical portion free of any adhering garbage or the like.

In this connection it may be stated that in Fig. 2 of the drawings I have exaggerated the clearance between the side edges of each blade 21 and the side walls 15 and 16 because in the preferred embodiment there is a wiping contact between them. In certain broader aspects of the invention the wiping contact, however, may be limited to the peripheral edges of the blades 21, but in the more specific aspect thereof I also desire to have this wiping relation between the side edges of said blades 21 and said casing 12.

In the operation, garbage, such as kitchen refuse, will be delivered to the casing 12 through the feed opening 17 and will be caught in a cell or compartment provided by two of the blades 21, as illustrated in Fig. 1 of the drawings. In this position of the parts it is possible for the operator to stick his hand down through the top feed opening 17 and remove any foreign material, such as silverware, which may inadvertently have gotten into the garbage, while being fully protected against harm, since the operator can not extend his arm down into the garbage grinder 10. The garbage and foreign matter are held during this operation between two blades 21, one on each side of said top opening, they forming a holding pocket between them.

The rotor 20 is mounted on a horizontal operating shaft 22 provided with a crank or handle and by rotating said shaft 22 the garbage may be dumped or delivered through the discharge opening 18 and into the grinder 10, all the while isolating the feed and discharge openings 17 and 18, respectively, both to protect the operator against sticking his hand down into the grinder and to prevent any material in the grinder, whether solid or gaseous, moving in a reverse direction upwardly through the feeder 11.

The rotor 20 may be readily removed by severing the casing 12 upon removal of the bolts 19. It is thus evident that I have produced a simple, but highly efficient, star rotor which is adapted particularly for use with a garbage grinder, though other uses thereof may become apparent to those skilled in the art.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

In combination, a garbage grinder having a top feed opening and a discharge opening, a garbage feeder above said grinder including a casing having an open top feed portion below which is a cylindrical portion the axis of which is horizontal, top and bottom feed and discharge openings leading to and from said cylindrical portion, said bottom discharge opening being disposed whereby garbage discharged from said feeder enters said grinder through its top feed opening, a star rotor in said cylindrical portion mounted for rotation upon the axis thereof having three relatively long thin radial flexible rubber blades providing relatively wide deep garbage receiving pockets between them, said blades providing at all times an isolating partition between said feed and discharge openings of said cylindrical portion and providing one large pocket for the inspection and picking of garbage through the top feed portion and the top feed opening of said cylindrical portion while said rotor is held with only one blade extending on each side of said top feed opening, the peripheral and side edges of said blades having wiping contact with the inside surfaces of said cylindrical portion of said casing, said rotor blades being formed of flexible rubber so that they can deflect during rotation when they encounter an obstruction and whereby they will wipe garbage from the inside surfaces of said cylindrical casing portion during rotation while at all times maintaining the feed opening of said grinder closed to garbage and liquids thrown thereby, and means for rotating said rotor.

LLOYD K. KNIGHT.

REFERENCES CITED

The following references are of record in the file of this patent:

UNITED STATES PATENTS

| Number | Name | Date |
| --- | --- | --- |
| 251,105 | Fowler et al. | Dec. 20, 1881 |
| 585,804 | Weber | July 6, 1897 |
| 1,143,634 | Lane et al. | June 22, 1915 |
| 1,245,868 | Caffey | Nov. 6, 1917 |
| 1,609,529 | Trowbridge | Dec. 7, 1926 |
| 1,648,747 | Stoner | Nov. 8, 1927 |
| 2,104,831 | McLemore | Jan. 11, 1938 |
| 2,152,632 | Cassiere | Apr. 4, 1939 |
| 2,156,075 | Alexay | Apr. 25, 1939 |
| 2,367,179 | Arnold | Jan. 16, 1945 |